(12) United States Patent
Saito et al.

(10) Patent No.: US 9,475,900 B2
(45) Date of Patent: Oct. 25, 2016

(54) DRILLING FLUID ADDITIVE

(71) Applicant: THE NIPPON SYNTHETIC CHEMICAL INDUSTRY CO., LTD., Osaka (JP)

(72) Inventors: Masahiro Saito, Osaka (JP); Midori Asai, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 0 days.

(21) Appl. No.: 14/103,422

(22) Filed: Dec. 11, 2013

(65) Prior Publication Data

US 2015/0159070 A1  Jun. 11, 2015

(51) Int. Cl.
*C08F 216/06* (2006.01)
*C09K 8/24* (2006.01)

(52) U.S. Cl.
CPC ............... *C08F 216/06* (2013.01); *C09K 8/24* (2013.01); *C09K 2208/12* (2013.01)

(58) Field of Classification Search
CPC . C09K 8/035; C09K 2208/12; C08F 216/06; C08F 218/08; C08F 226/04

USPC ...................................... 507/123; 525/56, 60
See application file for complete search history.

(56) References Cited

U.S. PATENT DOCUMENTS

| 4,455,240 A | * | 6/1984 | Costello | ................ 507/119 |
| 2007/0129258 A1 | | 6/2007 | Patel et al. | |
| 2009/0062158 A1 | | 3/2009 | Losasso et al. | |
| 2010/0273682 A1 | * | 10/2010 | Montgomerie et al. | ........ 507/90 |

FOREIGN PATENT DOCUMENTS

| JP | 57-23671 A | 2/1982 |
| JP | 8-85710 A | 4/1996 |

* cited by examiner

*Primary Examiner* — Frances Tischler
(74) *Attorney, Agent, or Firm* — Greenblum & Bernstein, P.L.C.

(57) ABSTRACT

The present invention provides a drilling fluid additive comprising a specific cation-modified PVA-based resin and a drilling fluid containing the same. The drilling fluid additive can reduce hydration swelling of inorganic clay mineral such as bentonite, and provide a drilling fluid such as drilling mud capable of forming a thin and tough mud wall on the stratum during drilling operation.

8 Claims, No Drawings

DRILLING FLUID ADDITIVE

FIELD OF THE INVENTION

The present invention relates to an additive added to a drilling fluid, in particular drilling mud, used for foundation of civil engineering works, drilling petroleum or natural gas well, or drilling deeply into a subterranean mine. The present invention also relates to drilling fluid containing the additive.

BACKGROUND

Drilling fluid is liquid circulating throughout the borehole during rotary drilling or workover operation of aging borehole, and therefore have the functions below:
(1) drilling fluid transports cuttings from the bottom of well to the surface of the ground;
(2) drilling fluid balances pressure in borehole to prevent formation fluid from blowing out;
(3) drilling fluid aids to form a thin and tough mud wall protecting the borehole wall, and thereby preventing the subterranean formation damage;
(4) drilling fluid keeps drilling rigs cool and lubricates them; and
(5) drilling fluid carries cuttings without sinking therein even if the drilling fluid is stopped circulation.

Drilling fluid is classified into water-based drilling fluid and oil-based drilling fluid. The drilling mud consisting mostly of water-bentonite suspension, and further containing additives such as dispersing agent, weighting material, polymers, salts, and lubricant for adjusting the drilling mud to the borehole condition, is commonly used.

Bentonite primarily contains clay mineral called as montmorillonite, and also contains another minerals such as feldspar and quartz. Such bentonite increases viscosity of the drilling fluid, and supports to transport the cuttings to the ground. Also, the bentonite aids to form mud wall on the surface of the borehole wall during drilling operation, and thereby minimizing subterranean formation damage. This function of the bentonite is explained as follows. Since the pressure of drilling fluid in the borehole is usually settled higher than the formation pressure, clay mineral (e.g. bentonite) contained in the drilling fluid invades pores of the formation in the borehole while drilling, and as a result, the mud wall is formed on the surface of the borehole wall. The resulting mud wall aids to prevent the subterranean formation damage during drilling operation, and reduce the friction against the drill string, and so on.

However, in the case of a simple drilling mud obtained by mixing bentonite with water and adding dispersing agent and weighting material to the mixture according to the condition of the borehole, such drilling mud may be used only for drilling shallow stratum or the like due to disadvantages of insufficient resistance to damage, salt- or cement-sensitive property, and unstability to temperatures. In order to provide a drilling fluid having the above-mentioned functions (1)-(5), even when used for a large scale construction or underground continuous wall construction, addition of various additives is required.

Examples of typical additives include a salt containing potassium ion and the like, and a polymer such as acrylate-based polymer, carboxymethyl cellulose, and polysaccharide.

It is known that potassium ion is superior to other cations capable of electrically adsorbing to montmorillonite, with respect to suppression of swelling of montmorillonite. It is also known that the above-mentioned polymers enable to enhance a resistance of bentonite drilling mud to cement contamination, and enable to inhibit excessive viscosity increase of the drilling mud by acting as a dispersing agent of the drilling mud.

Besides the above-listed polymers, a modified polyvinyl alcohol (called as "modified PVA") is also known as a polymer added to drilling fluid. For example, JP S57-23671A suggests the use of carboxylic acid-modified PVA, and JP H08-85710A suggests the use of sulfonic acid-modified PVA having a specific chemical structure.

JP S57-23671A discloses that the use of carboxylic acid-modified PVA can form a thinner and stable membrane comparing to the use of conventional stabilizers (e.g. carboxymethyl cellulose, non-modified PVA, and sulfonic acid-modified PVA). JP H08-85710A discloses that the specific sulfonic acid-modified PVA is superior to acrylate-based polymer with respect to dispersibility of the drilling mud.

The bentonite drilling mud containing a modified PVA is supposed to be excellent in dispersibility and formability of mud wall, comparing with a common bentonite drilling mud containing acrylate-based polymer, carboxymethyl cellulose, or polysaccharide, or the like.

Montmorillonite as a main component of bentonite has a structure of layered crystalline, and therefore swells by invasion of water between layers thereof. Such hydration swelling of montmorillonite may cause to damage the membrane formed on the borehole wall. Further, destruction of layered structure caused from the hydration swelling of bentonite varies a viscosity of the drilling fluid, and therefore the drilling fluid may not ensure the sufficient function of transporting drill cuttings upward to the ground.

US2007/0129258A discloses that the use of cation-modified PVA-based resin together with shale hydration inhibitor agent can prevent hydration swelling of shale clay to control a rheological property.

However, the cation-modified PVA-based resin used in US2007/0129258A, does not have a satisfied effect of preventing collapse of the membrane on the wall caused by swelling of bentonite. Accordingly, a further excellent drilling fluid additive is desired.

SUMMARY OF THE INVENTION

It is an object of the present invention to provide a drilling fluid additive capable of further reducing hydration swelling of shale clay.

The present inventors have studied hard about modified PVAs, and found a cation-modified PVA-based resin exhibiting a low swelling, and arrived at the present invention.

A drilling fluid additive of the present invention comprises a polyvinyl alcohol-based resin containing a structural unit represented by the following general formula (1).

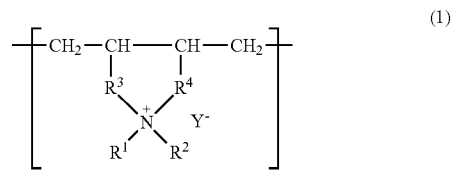

In the formula (1), $R^1$ and $R^2$ are independently hydrogen atom or an alkyl group having 1 to 3 carbon atoms, and may be identical or different from each other. $R^3$ and $R^4$ are independently an alkylene group having 1 to 3 carbon atoms, and may be identical or different from each other. Y is a halogen.

The cation-modified PVA-based resin having the specific structure shown above may act as an excellent dispersing agent of clay component in the drilling fluid, as well as may suppress hydration swelling of bentonite contained in drill cuttings and borehole wall. Accordingly, a drilling fluid containing the drilling fluid additive including cation-modified PVA-based resin having the above specific structure can form thin and tough mud wall with reduced hydration swelling of bentonite on the stratum surface. And the collapse caused by hydration swelling of bentonite or the like as a primary element of the mud wall can be suppressed, which ensures stability of the borehole surface while drilling. Furthermore, since the suppression of hydration swelling of bentonite can reduce viscosity change of the drilling fluid during circulation thereof, transportation of drill cuttings to the ground can be executed stably.

DESCRIPTION OF EMBODIMENTS

The present invention will be described in detail below.

A drilling fluid additive of the present invention comprises a polyvinyl alcohol-based resin containing a structural unit represented by the following general formula (1).

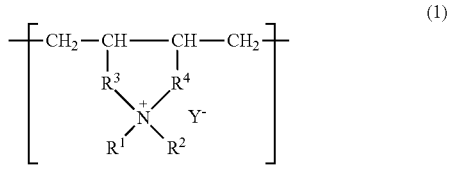

(1)

The cation-modified PVA-based resin used in the present invention is obtained by copolymerizing a cationic monomer represented by the following general formula (2) and a vinyl ester monomer such as vinyl acetate, and saponifying the resulting copolymer.

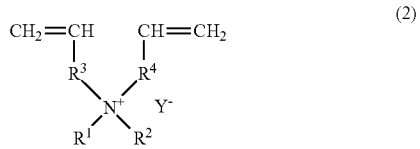

(2)

In the formulae (1) and (2), $R^1$ and $R^2$ are independently hydrogen atom or an alkyl group having 1 to 3 carbon atoms, and may be identical or different from each other. $R^3$ and $R^4$ are independently an alkylene group having 1 to 3 carbon atoms. It is preferable that both of $R^1$ and $R^2$ are methyl group, and both of $R^3$ and $R^4$ are methylene group.

In the formulae (1) and (2), Y is a halogen such as F, Cl, Br, and I, preferably Cl.

The cationic monomer represented by the formula (2) includes, for instance, diallyl dimethyl ammonium chloride, diallyl dimethyl ammonium bromide, diallyl diethyl ammonium chloride, diallyl diethyl ammonium bromide, diallyl ethyl methyl ammonium chloride, diethyl ethyl methyl ammonium bromide, and the like. Among them, diallyl dimethyl ammonium chloride is preferably used.

The cation-modified PVA-based resin used in the present invention contains a unit of the formula (1) derived from the cationic monomer of the formula, vinyl alcohol unit of the following general formula (3a), and a vinyl ester unit indicated by the following general formula (3b). The vinyl alcohol unit is produced by saponification of the unit derived from vinyl ester monomer such as vinyl acetate, and the vinyl ester unit is a unit remaining unsaponified after the saponification step.

[formula 3]

(3a)

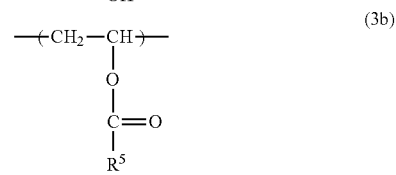

(3b)

In the formulae (3a) and (3b), $R^5$ is an alkyl group having 1 to 18 carbon atoms or aromatic such as phenyl group, preferably methyl group.

Vinyl formate, vinyl propionate, vinyl valerate, vinyl butyrate, vinyl isobutyrate, vinyl pivalate, vinyl caprate, vinyl laurate, vinyl stearate, vinyl benzonate, or vinyl versatate may be used as a vinyl ester monomer other than vinyl acetate.

In addition to the units indicated by the above formulae (1), (3a), and (3b), the cation-modified PVA-based resin used in the present invention may contain another unit derived from an unsaturated monomer, as far as the content is in the range of 10 mol % or less, preferably 5 mol % or less relative to the total units.

Examples of the other unsaturated monomer include α-olefin such as ethylene and propylene; hydroxy group-containing α-olefins such as 3-buten-1-ol, 4-penten-1-ol; unsaturated acids such as vinylene carbonates and acrylic acid, a salt thereof, or mono- or di-alkyl ester thereof; nitriles such as acrylonitrile; amides such as methacrylamide; olefin sulfonic acid such as ethylene sulfonic acid, allyl sulfonic acid, methallyl sulfonic acid, or a salt thereof.

The cation-modified PVA-based resin having the above-mentioned structure can suppress hydration swelling of bentonite. Although the mechanism of the suppression is not demonstrated, it is supposed as follows. Since montmorillonite as primary part of bentonite particle is charged negative, cation-modified PVA-based resin could have higher affinity for bentonite than unmodified PVA-based resin or sulfonic acid-modified PVA-based resin. In addition, cation-modified PVA-based resin could capture water molecule surrounding the PVA portion thereof owing to the hydrophilicity of the PVA-based resin, and inhibit invasion of the water molecule into bentonite, that is, between unit layers of the montmorillonite having layered structure. In particular, in the case of cation-modified PVA-based resin having a structure unit represented as the formula (1) used in the present invention, quaternary ammonium ion portion as a cation portion of the cation-modified PVA-based resin forms a ring structure linked with polymer main chain of the cation-modified PVA-based resin. And therefore the cation-modified PVA-based resin could have higher affinity than a cation-modified PVA-based resin having a pendant structure where the cation portion is hanged via single alkyl chain from the polymer main chain, or another conventional cation-modified PVA-based resin. Furthermore, the cation-modified PVA-based resin having a structure unit of the formula (1) would efficiently inhibit the invasion of water molecule into bentonite particle surrounding the cation-modified PVA-based resin because the cation-modified PVA-based resin can form hydrogen bond with water molecule like a typical PVA-based resin.

The cation-modified PVA-based resin used in the present invention may be obtained by copolymerizing cationic monomer indicated by the above formula (2) with vinyl ester monomer such as vinyl acetate, and saponifying the resulting copolymer. Any known polymerization technique, for instance, bulk polymerization, solution polymerization, suspension polymerization, dispersion polymerization, or emulsion polymerization, may be employed for the copolymerization, and solution polymerization with use of methanol or toluene is preferably employed for industrial scale.

Monomers for polymerization may be fed by an appropriate method, for instance, feeding at one time, separately feeding or continuously dropping. In the case of polymerization in the presence of chain transfer agent, it is preferred to add chain transfer agent according to the reaction rate of vinyl acetate in order not to vary excessively the content of the chain transfer agent per vinyl acetate in the polymerization system, thereby attaining to an intended modification amount.

Any saponification technique known as a saponification technique of polyvinyl acetate-based polymer may be employed for the resultant copolymer. Both alkali saponification and acid saponification may be employed, and methanolysis in the presence of NaOH or $CH_3ONa$ as a catalyst is the most advantageous for industrial scale.

The cation-modified PVA-based resin used in the present invention has an average polymerization degree of usually 200 to 3000, preferably 300 to 2800, more preferably 400 to 2600. When the average polymerization degree is too small, suppression of hydration swelling of shale clay such as bentonite tends to be lowered, and resulting in lowering collapse resistance of mud wall. On the contrary, when the average polymerization degree is too large, productivity of PVA-based resin tends to be lowered.

The cation-modified PVA-based resin used in the present invention has a saponification degree of usually 65 mol % or more, preferably 75 mol % or more, particularly preferably 85 mol % or more. When the saponification degree is too small, preparation of its aqueous solution becomes difficult because the function of such cation-modified PVA-based resin as a dispersing agent for clay mineral is lowered, and as a result, collapse resistance becomes insufficient. The average polymerization degree and saponification degree are measured according to JIS K6726.

The cation-modified PVA-based resin used in the present invention has a content of structural unit of the formula (1), i.e. introduction amount of cationic group, of usually 0.1 to 10 mol %, preferably 0.2 to 5 mol %, and particularly preferably 0.3 to 3 mol %. When the content of the cationic structural unit is too low, the affinity for clay with negative charge is lowered due to a component with negative charge like montmorillonite, and as a result, collapse resistance of the mud wall tends to be lowered. On the other hand, When the content of cationic structural unit is too high, the productivity of the cation-modified PVA-based resin tends to be lowered.

The drilling fluid additive of the present invention contains a cation-modified PVA-based resin mentioned above. The content of the cation-modified PVA-based resin is in the range of usually 0.05 to 20%, preferably 0.1 to 10%, more preferably 1 to 8% by weight based on the total weight of the drilling fluid additives. The content of the cation-modified PVA-based resin is in the range of usually 0.01 to 10%, preferably 0.1 to 3%, more preferably 0.3 to 2% by weight based on the weight of the drilling fluid. The content ratio of the cation-modified PVA-based resin to clay mineral in the drilling fluid, i.e. clay mineral:cation-modified PVA-based resin (weight ratio), is in the range of usually 30:1 to 1:1, preferably 10:1 to 2:1, more preferably 6:1 to 3:1. Too low content of the cation-modified PVA-based resin causes to lower the collapse resistance, and too high content of the cation-modified PVA-based resin causes to increase a cost.

The drilling fluid additive of the present invention contains the cation-modified PVA-based resin mentioned above, and may further contain acid, friction reducer, surfactant, salts, gelling agent, pH adjusting agent, and another water-soluble polymer, according to needs.

Examples of the salts include potassium chloride, sodium chloride, calcium chloride, ammonium salt, phosphate, carbonate, and sulfate, and preferably potassium chloride. The content of the salts is in the range of usually 0.1 to 30%, preferably to 20%, by weight based on the weight of the drilling fluid. Potassium ion contributes to enhance stability of mud membrane and transporting ability of drill cuttings, however, large content of potassium ion makes difficult to control fluidity due to its strong cohesive force.

Examples of the other water-soluble polymers include carboxymethyl cellulose, starch, polyacrylamide, and the like. Such water-soluble polymer may be contained in an amount without impairing the effect of the invention.

A drilling fluid of the present invention comprises an inorganic clay mineral, a drilling fluid additive of the present invention, and water or oil. The content of the drilling fluid additive is in the range of usually 0.01 to 5%, preferably 0.1 to 3%, particularly preferably 0.5 to 2%, by weight based on the weight of the drilling fluid.

As the inorganic clay mineral, a conventional inorganic clay mineral, for instance, smectite-based compound such as montmorillonite, quartz, cristobalite, feldspars, bentonite-based compound, beidellite, nontronite, saponite, hectorite, sauconite, and stevensite may be used. Among them, bentonite-based compound is preferred. The inorganic clay mineral is contained in a content of usually 0.05 to 20%, preferably 0.1 to 10% by weight based on the drilling fluid.

Inorganic clay mineral such as bentonite and so on is contained in the drilling fluid by not only adding beforehand to drilling fluid for adjusting viscosity, but also being incorporated as cuttings generated during drilling operation. However, extra bentonite transported from the bottom hole during circulation of the drilling fluid is generally filtrated, and thereby usually maintaining a constant level of the bentonite content.

Example

Further, the present invention will be explained in detail by referring to examples. It is not construed that the present invention is limited to the examples without departing from the spirit and scope of the present invention. In the examples, "%" and "parts" are based on weight.

Example 1

22 parts of methanol, 100 parts of vinyl acetate, and 0.3 part of diallyl dimethyl ammonium chloride were fed into a reaction vessel equipped with reflux condenser, dropping funnel, and agitator. The polymerization of the resultant mixture was carried out with use of azobisisobutyronitrile as an initiator under heating to reflux in the flow of nitrogen. Then, 1.4 parts of methanol solution of diallyl dimethyl ammonium chloride (50%) were dropped into the polymerization system over a period of 4 hours, and m-dinitrobenzene as a polymerization inhibitor was added at the time of attaining to 70% of the intended polymerization degree, and thereby terminating the polymerization reaction. Subsequently, unreacted monomer was removed out of the reaction system by blowing methanol vapor into the system, and a methanol solution of the copolymer was obtained.

Next, the obtained methanol solution of the copolymer was adjusted to the concentration of 32% by diluting with methanol, and put into a kneader. In the kneader, saponification of the copolymer was carried out by adding methanol solution of sodium hydroxide (concentration: 3.5%) in the amount of 4.3 mmol per vinyl acetate unit of the copolymer, with maintaining the solution temperature at 35° C. The resultant solid was filtrated, rinsed with methanol, and dried in hot air dryer, and thereby obtaining the intended cation-modified PVA-based resin.

The obtained cation-modified PVA-based resin has a saponification degree of 86.8 mol %, according to the measurement by alkali consumption required for hydrolysis of the remaining vinyl acetate. And the obtained cation-modified PVA-based resin has a polymerization degree of 1600, and the viscosity of 20.2 mPa·s as 4% aqueous solution thereof. Also, the amount of cationic group introduced into the cation-modified PVA-based resin is 1.0 mol %, according to the calculation of the measurement result of $^1$H-NMR.

<Collapse Resistance Test>

Raw bentonite ore was pulverized to obtain bentonite powder passing through the sieve (mesh size 850 μm). The bentonite powder was dried at 120° C. for 6 hours. On the other hand, a case (height: 5 mm, inner diameter: 30 mm) made of polyvinyl chloride, which was weighed beforehand, was prepared. Bentonite pellet was obtained by filling the dried bentonite powder of 5.5 g in the prepared case, and pressing with a pressure of 10 kN from upper side. Thus obtained bentonite pellet in the case was immersed for 6 hours in 100 g of the cation-modified PVA-based resin aqueous solution (0.5 wt %) prepared by solving the above synthesized cation-modified PVA-based resin in water, and pulled out. After removing water on the surface of the bentonite pellet in the case, the weight of the bentonite pellet together with the case was measured to calculate the rate of swelling.

Rate of swelling=(weight after immersion−weight before immersion)/weight before immersion The calculation result was shown in Table 1.

Comparative Example 1

Cation-modified PVA-based resin indicated by the following chemical formula (4) (saponification degree: 88.1 mol %, 4% aqueous solution viscosity: 20.0 mPa·s, polymerization degree: 1600) was used in place of the cation-modified PVA-based resin used in example 1. The collapse resistance test was carried out in the same manner as example 1, and the result was shown in Table 1.

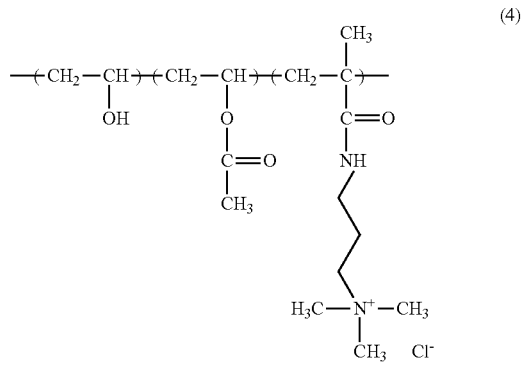

TABLE 1

|  | Example 1 | Comparative Example 1 |
| --- | --- | --- |
| saponification degree (mol %) | 86.8 | 88.1 |
| 4% aqueous solution viscosity (mPa · s) | 20.2 | 20.0 |
| polymerization degree | 1600 | 1600 |
| amount of cationic group (mol %) | 1.0 | 2.0 |
| rate of swelling | 1.5 | 1.6 |

As seen from Table 1, the rate of swelling of the bentonite pellet of example 1 was smaller than that of comparative example 1, regardless that both examples have similar polymerization degree and saponification degree. It is understood that the bentonite drilling mud containing cation-modified PVA-based resin having a unit of the formula (1) could considerably reduce hydration swelling of shale clay such as bentonite, comparing with the bentonite drilling mud containing the cation-modified PVA-based resin having a unit of the formula (4).

Accordingly, the drilling fluid such as drilling mud containing a drilling fluid additive of the present invention can form thin and tough mud wall on the stratum surface of borehole wall. The formed mud wall can prevent collapse of the stratum, because the hydration swelling of shale clay such as bentonite as a primary component of the mud wall is reduced. Furthermore, even if the drilling fluid is contaminated by bentonite as drill cuttings, the bentonite may be free from damage caused by the hydration swelling thereof, and therefore the drilling fluid would be free from large variation in viscosity by discharging drill cuttings from the drilling fluid through filtration during circulation.

What is claimed is:

1. A drilling fluid additive comprising polyvinyl alcohol-based resin containing a cationic structural unit represented by formula (1), a vinyl alcohol structural unit represented by formula (3a), and a vinyl ester structural unit represented by formula (3b), and excluding a carboxylic acid functional monomer unit,

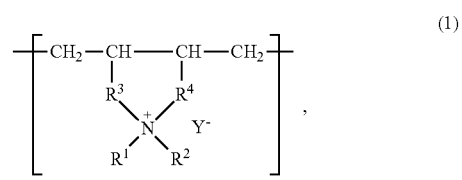

-continued

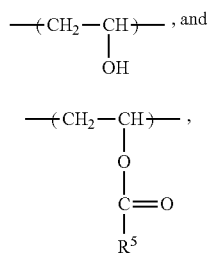

wherein $R^1$ and $R^2$ are independently a hydrogen atom or an alkyl group having from 1 to 3 carbon atoms, and may be identical or different from each other, and $R^3$ and $R^4$ are independently an alkylene group having from 1 to 3 carbon atoms, and may be identical or different from each other, Y is a halogen, and $R^5$ is an alkyl group having from 1 to 18 carbons or an aromatic group, wherein the content of the cationic structural unit is from 0.3 to 2 mol %, and wherein the polyvinyl alcohol-based resin has a saponification degree of 70 to less than 100 mol %.

2. The drilling fluid additive according to claim 1, wherein the polyvinyl alcohol-based resin has a polymerization degree of 200 to 3000.

3. The drilling fluid additive according to claim 1, further comprising a salt.

4. The drilling fluid additive according to claim 1, wherein the content of the polyvinyl alcohol-based resin is in the range of 0.01 to 10% by weight based on the weight of drilling fluid.

5. The drilling fluid additive according to claim 1, wherein each of $R^3$ and $R^4$ is a methylene group.

6. A drilling fluid comprising inorganic clay mineral, a medium, and polyvinyl alcohol-based resin containing a cationic structural unit represented by formula (1), a vinyl alcohol structural unit represented by formula (3a), and a vinyl ester structural unit represented by formula (3b), and excluding a carboxylic acid functional monomer unit,

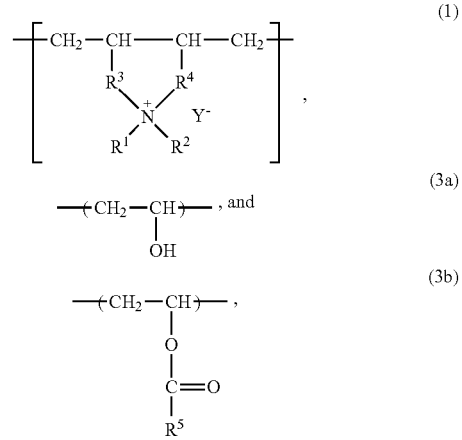

wherein $R^1$ and $R^2$ are independently a hydrogen atom or an alkyl group having from 1 to 3 carbon atoms, and may be identical or different from each other, and $R^3$ and $R^4$ are independently an alkylene group having from 1 to 3 carbon atoms, and may be identical or different from each other, Y is a halogen, and $R^5$ is an alkyl group having from 1 to 18 carbons or an aromatic group, wherein the content of the cationic structural unit is from 0.3 to 2.0 mol %, and wherein the polyvinyl alcohol-based resin has a saponification degree of 70 to less than 100 mol %.

7. The drilling fluid according to claim 6, wherein the inorganic clay mineral is bentonite.

8. The drilling fluid according to claim 6, wherein the medium is water.

* * * * *